US009777431B1

(12) United States Patent
Wang et al.

(10) Patent No.: US 9,777,431 B1
(45) Date of Patent: Oct. 3, 2017

(54) EXCESS HEAT RECOVERY DURING HIGH TEMPERATURE PULP BLEACHING

(71) Applicant: GuangXi Bossco Environmental Protection Technology Co., LTD, Nanning (CN)

(72) Inventors: Shuangfei Wang, Nanning (CN); Shuangxi Nie, Nanning (CN); Chengrong Qin, Nanning (CN); Xueping Song, Nanning (CN); Haichuan Zhang, Nanning (CN); Kun Zhang, Nanning (CN)

(73) Assignee: GuangXi University, Nanning (CN)

( * ) Notice: Subject to any disclaimer, the term of this patent is extended or adjusted under 35 U.S.C. 154(b) by 0 days.

(21) Appl. No.: 15/587,077

(22) Filed: May 4, 2017

(30) Foreign Application Priority Data

Mar. 13, 2017 (CN) .......................... 2017 1 0147024

(51) Int. Cl.
*D21C 9/14* (2006.01)
*D21C 9/16* (2006.01)
*D21C 11/06* (2006.01)

(52) U.S. Cl.
CPC .................. *D21C 9/14* (2013.01); *D21C 9/16* (2013.01); *D21C 11/06* (2013.01)

(58) Field of Classification Search
CPC ....................................................... D21C 9/14
See application file for complete search history.

(56) References Cited

U.S. PATENT DOCUMENTS

| 3,585,147 | A | * | 6/1971 | Gordon | ..................... | C02F 1/76 |
| | | | | | | 252/187.21 |
| 6,136,145 | A | * | 10/2000 | Henricson | ................ | D21C 3/24 |
| | | | | | | 162/47 |
| 8,632,656 | B2 | * | 1/2014 | Vehmaa | ............. | D21C 11/0021 |
| | | | | | | 162/29 |

OTHER PUBLICATIONS

Dence editor, Pulp Bleaching: Principles and Practice, 1996, TAPPI Press, p. 61 and 391.*

* cited by examiner

*Primary Examiner* — Anthony Calandra
(74) *Attorney, Agent, or Firm* — LeonardPatel PC

(57) ABSTRACT

An excess heat recovery apparatus and process for high temperature chlorine dioxide bleaching of pulp is provided. The pulp of the high temperature chlorine dioxide bleaching stage enters a tube-side of a chlorine dioxide preheater through a pipeline. The low-temperature chlorine dioxide in the storage tank enters a shell-side pipeline of the chlorine dioxide preheater. 0.5 mol/L of a stabilizer may be added during preheating to prevent $ClO_2$ from decomposing during the heating process. Preheated chlorine dioxide is then moved into a pulp mixer and the pH is adjusted to 3.2-3.8. The mixed pulp is then moved into a high temperature chlorine dioxide bleaching tower for bleaching. The cooling pulp, now out of the preheater, is washed in an alkaline extraction stage. The waste water from the washing flows directly into an effluent treatment system and is recycled after treatment.

19 Claims, 3 Drawing Sheets

EXCESS HEAT RECOVERY DURING HIGH TEMPERATURE PULP BLEACHING

CROSS REFERENCE TO RELATED APPLICATION

This application claims the benefit of Chinese Patent Application No. 201710147024.3 filed Apr. 5, 2017. The subject matter of this earlier filed application is incorporated by reference in its entirety.

FIELD

The present invention generally relates to pulp bleaching, and more particularly, to a process, system, and apparatus for clean pulp bleaching with reduced emissions where excess heat recovery is performed during high temperature chlorine dioxide ($ClO_2$) bleaching of pulp.

BACKGROUND

The production scale and production technology of the paper industry is constantly increasing and improving as demand for paper increases. Environmental pollution and excess capacity caused by conventional pulp and papermaking processes have attracted increasing attention from both governments and enterprises. Energy saving processes, emissions reduction, and clean production of pulp and paper are of interest.

In Europe and the United States, for instance, heavy use of oil and natural gas fuel occurs during pulp bleaching. These two kinds of fossil fuel generally have a higher combustion efficiency and less energy consumption relative to other fossil fuels, such as coal. In China, coal is currently given priority in pulp bleaching. Compared with natural gas, the combustion efficiency of coal is lower and it causes more pollution. Therefore, the energy consumption of the pulp bleaching industry in China is significantly higher than in Europe and the United States. Accordingly, a document entitled "State Council on the Strengthening of Energy-Saving Work in the Decision" was released in China in 2006. This document recommends of enterprise sustainable development to speed up the construction energy-saving pulp production processes.

Following the abandonment of chlorine as a bleaching agent due to environmental considerations, two technologies were developed. The main conventional pulp bleaching technologies are elemental chlorine free (ECF) bleaching based on chlorine dioxide ($ClO_2$) and total chlorine free (TCF) bleaching with hydrogen peroxide or enzymes. The main distinguishing factor between these two processes is whether chlorine dioxide is used—it is used in ECF, but not in TCF. To compensate for the lack of chlorine dioxide, TCF will either add higher dosages of peroxide or supplement the process with ozone. ECF is more commonly used. In 2012, ECF pulp constituted 93% of the world share of the bleached chemical pulp market. TCF, although decreasing slightly in market share, has remained at approximately 5% of the bleached chemical pulp market.

Initially TCF appeared to hold promise as an alternative to ECF with respect to the generation of environmentally harmful substances. However, several studies have shown no significant difference between the two technologies when best available techniques are used. No measurable levels of dioxins are present with either ECF or TCF. However, TCF exhibits weaker fiber strength, has a lower brightness potential, has lower yield, and has higher energy requirements. Also, TCF significantly influences the viscosity of fully bleached pulp. This has further eroded its promise as a successor to ECF. Chlorine dioxide bleaching is used as the first stage of ECF bleaching, but adsorbable organic halides (AOX) can still be detected in the $D_0$ bleaching stage effluent.

High temperature chlorine dioxide bleaching ($D_{HT}$) has been a success in pulp bleaching because the content of AOX in the high temperature chlorine dioxide bleaching wastewater is much less than that in the conventional Do stage bleaching wastewater. There is a potential for heat energy self-sufficiency, and further improvements in chlorine dioxide usage and efficiency of ECF bleaching remain a goal. Accordingly, an improved process and apparatus for reducing emissions and clean production of pulp bleaching may be beneficial.

SUMMARY

Certain embodiments of the present invention may provide solutions to the problems and needs in the art that have not yet been fully identified, appreciated, or solved by conventional pulp bleaching technologies. For example, some embodiments pertain to a process and apparatus for clean pulp bleaching with reduced emissions where excess heat recovery is performed during high temperature chlorine dioxide bleaching of pulp. This process may require less steam and/or less chlorine dioxide than conventional ECF processes. Bleached pulp from the $D_{HT}$ stage may be sent through a dedicated pipeline to a chlorine dioxide preheater. Chlorine dioxide under the effect of a stabilizer is heated to a certain temperature and then mixed into the pulp. The preheating of chlorine dioxide not only saves energy and reduce cost, but can also reduce pollution and improve bleaching efficiency.

In an embodiment, a method includes adding a stabilizer to chlorine dioxide to keep the chlorine dioxide stable during heating. The method also includes introducing heated thermal bleaching pulp into a preheater and introducing the chlorine dioxide and stabilizer into the preheater in a separate, but thermally connected, location to the heated thermal bleaching pulp. The method further includes heating the chlorine dioxide using heat from the heated thermal bleaching pulp.

In another embodiment, a method for preheating chlorine dioxide using heated DHT thermal bleaching pulp includes introducing the heated DHT thermal bleaching pulp into a preheater and introducing the chlorine dioxide into the preheater in a separate, but thermally connected, location to the heated DHT thermal bleaching pulp. The method also includes heating the chlorine dioxide using heat from the heated DHT thermal bleaching pulp.

In yet another embodiment, a method for preheating chlorine dioxide using heated DHT thermal bleaching pulp includes adding a stabilizer to the chlorine dioxide to keep the chlorine dioxide stable during heating. The chlorine dioxide is at a temperature of 2.4 to 4.6° C. prior to heating. The method also includes introducing the heated DHT thermal bleaching pulp into a preheater and introducing the chlorine dioxide and stabilizer into the preheater in a separate, but thermally connected, location to the heated DHT thermal bleaching pulp. The method further includes heating the chlorine dioxide using heat from the heated DHT thermal bleaching pulp until the chlorine dioxide reaches a temperature of 31 to 37° C. The thermal bleaching pulp remains in the preheater until reaching a temperature of 23 to 26° C.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a process and apparatus for clean pulp bleaching with reduced emissions where excess heat recovery is performed during high temperature chlorine dioxide bleaching of pulp. Excess heat recovery may be performed at the $D_{HT}$ stage of pulp bleaching by adding sodium percarbonate as a chlorine dioxide stabilizer and using the relatively high temperature of the $D_{HT}$ stage pulp and preheated chlorine dioxide in order to improve the steam utilization efficiency of the bleaching plant, improve the efficiency of chlorine dioxide bleaching, and reduce polluting emissions. More specifically, in some embodiments, the pulp of the high temperature chlorine dioxide bleaching stage enters a tube-side of a chlorine dioxide preheater through a pipeline. The preheater used in some embodiments is a tube-type heat exchanger. This heat exchanger includes a tube-side and a shell-side. The pulp goes in the tube-side, while chlorine dioxide goes in the shell-side.

The relatively low-temperature chlorine dioxide in the storage tank enters a shell-side pipeline of the chlorine dioxide preheater. 0.5 mol/L of sodium percarbonate stabilizer may be added during preheating to prevent chlorine dioxide from decomposing during the heating process. Preheated chlorine dioxide is then moved into a pulp mixer and the pH is adjusted to 3.2-3.8. The mixed pulp is then moved into a high temperature chlorine dioxide bleaching tower for bleaching. The cooling pulp, after being pumped back through the preheater, is washed in an alkaline extraction stage. The waste water from the washing flows directly into an effluent treatment system and is recycled after treatment.

In some embodiments, the temperature of the chlorine dioxide solution may be increased from 2.4-4.6° C. to 31-37° C. during preheating. In order to prevent the chlorine dioxide from decomposing during the preheating process, 0.5 mol/L of sodium percarbonate (2 Na$_2$CO$_3$.3 H$_2$O$_2$) may be added to the chlorine dioxide solution before preheating. The additive amount of sodium percarbonate may be 0.005-0.01 liters for every liter of chlorine dioxide solution in some embodiments. In certain embodiments, the ratio of NaHCO$_3$ to H$_2$O$_2$ in the sodium percarbonate solution may be 1 to 0.5-0.7, respectively.

Some embodiments provide significant advantages over conventional pulp bleaching processes. For instance, the reuse of excess heat may reduce the need for steam for high temperature chlorine dioxide bleaching, reducing the consumption of energy and bleaching costs. Also, preheating the chlorine dioxide may shorten the heating time, reducing the temperature difference between the chlorine dioxide and the pulp. This improves the bleaching efficiency of the chlorine dioxide.

EXAMPLE 1

Figure 1:
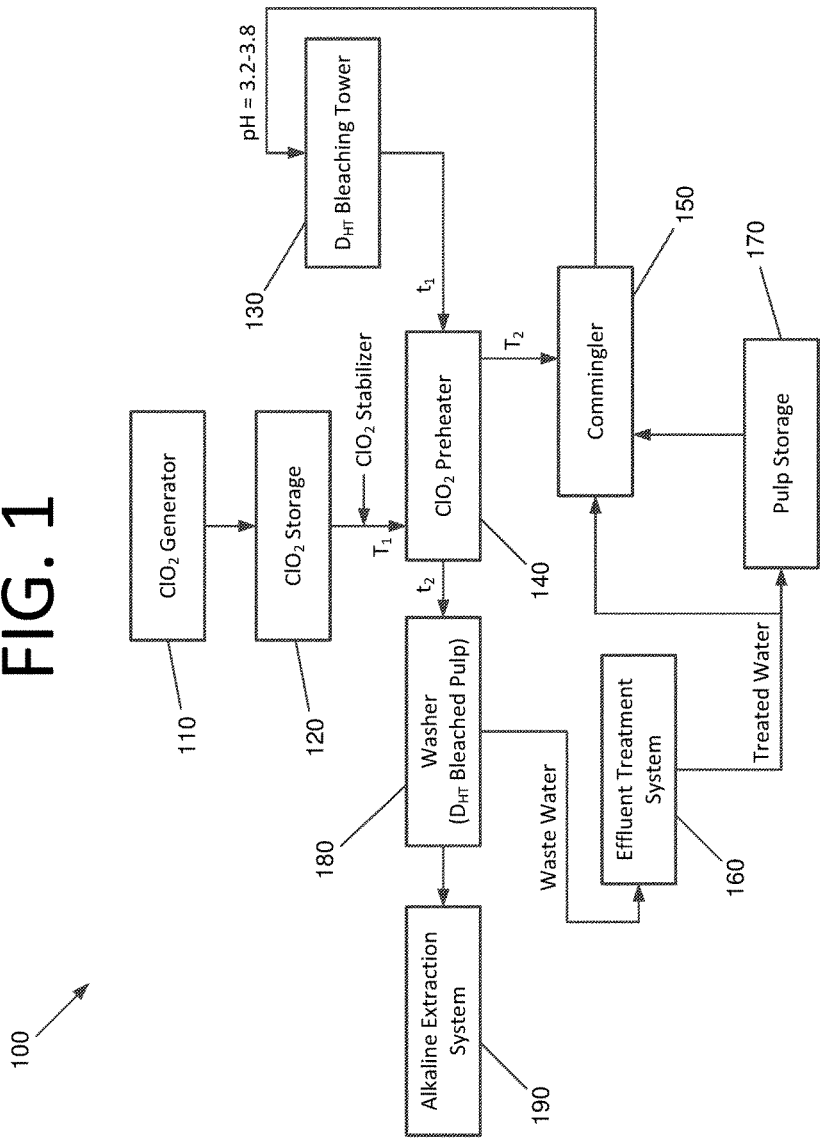
FIG. 1 is a flowchart illustrating a pulp bleaching system with excess heat recovery, according to an embodiment of the present invention.

FIG. 1 illustrates a pulp bleaching system 100 with excess heat recovery, according to an embodiment of the present invention. A chlorine dioxide generator 110 produces chlorine dioxide, which is stored in chlorine dioxide storage tank 120 at a storage temperature of 2.4-4.6° C. The thermal bleaching pulp ($t_1$) of the high temperature chlorine dioxide bleaching stage provided by $D_{HT}$ bleaching tower 130 enters the tube-side of a chlorine dioxide preheater 140 through a pipeline. The relatively low-temperature chlorine dioxide ($T_1$) in the storage tank enters the shell-side pipeline of chlorine dioxide preheater 140. 0.5 mol/L of ClO$_2$ stabilizer (e.g., sodium percarbonate) is added to the relatively low-temperature chlorine dioxide ($T_1$) for preheating in order to prevent the chlorine dioxide from decomposing during the heating process. The higher temperature thermal bleaching pulp heats the chlorine dioxide to the desired temperature. The chlorine dioxide and the $D_{HT}$ pulp are kept physically separated from one another.

After heating, preheated chlorine dioxide ($T_2$) is introduced into a pulp mixer (commingler 150), along with treated water from effluent treatment system 160 and pulp from pulp storage 170, and the pH is adjusted to 3.2-3.8. The mixed pulp is then pumped into high temperature $D_{HT}$ bleaching tower 130 for bleaching, and then into preheater 140. The cooling pulp ($t_2$) is pumped out of chlorine dioxide preheater 140 and into washer 180. The pulp is washed by washer 180 and alkaline extraction is performed by alkaline extraction system 190. The waste water from washer 180 is pumped into effluent treatment system 160 and treatment and recycling of the waste water is performed. This treated water is then available for commingler 150 and pulp storage 170.

EXAMPLE 2

Relatively low-temperature chlorine dioxide ($T_1$=2.6° C., concentration is 8.0 g/L in this embodiment) in storage tank 120 enters the shell-side pipeline of chlorine dioxide preheater 140. 0.5 mol/L of ClO$_2$ stabilizer (e.g., sodium percarbonate) is added into the chlorine dioxide solution. The thermal bleaching pulp ($t_1$=85° C.) of the relatively high temperature chlorine dioxide bleaching stage provided by $D_{HT}$ bleaching tower 130 enters the tube-side of chlorine dioxide preheater 140 through a pipeline. Preheated chlorine dioxide ($T_2$=31° C., concentration is 7.9 g/L in this embodiment) is then pumped into the pulp mixer (commingler 150), along with treated water from effluent treatment system 160 and pulp from pulp storage 170, and the pH is adjusted to 3.2-3.8. The mixed pulp is then pumped into $D_{HT}$ bleaching tower 130 for bleaching, and then into preheater 140.

The cooling pulp ($t_2$=23° C.) is pumped out of preheater 140 into washer 180. The pulp is then washed by washer 180 and alkaline extraction is performed by alkaline extraction system 190. The waste water from washer 180 is pumped into effluent treatment system 160, treated, and recycled.

In conventional high temperature chlorine dioxide bleaching without preheating the chlorine dioxide, the steam consumption per ton of dry pulp is approximately 1,070 kg/h, and the chlorine dioxide dosage is 2.5%. This is compared with the high temperature chlorine dioxide bleaching of this embodiment, where the steam consumption per ton of dry pulp is approximately 651.88 kg/h, and the chlorine dioxide dosage was 2.2% to achieve the same brightness. This results in a reduction in the steam consumption per ton of dry pulp per hour of 39.05% and a 12% reduction in the amount of chlorine dioxide that is used to achieve the same brightness.

EXAMPLE 3

Relatively low-temperature chlorine dioxide ($T_1=2.6°$ C., concentration is 8.0 g/L in this embodiment) in storage tank 120 enters the shell-side pipeline of chlorine dioxide preheater 140. 0.5 mol/L of $ClO_2$ stabilizer (e.g., sodium percarbonate) is added into the chlorine dioxide solution. The thermal bleaching pulp ($t_1=90°$ C.) of the relatively high temperature chlorine dioxide bleaching stage provided by $D_{HT}$ bleaching tower 130 enters the tube-side of chlorine dioxide preheater 140 through a pipeline. Preheated chlorine dioxide ($T_2=35°$ C., concentration is 7.8 g/L in this embodiment) is pumped into the pulp mixer (commingler 150), along with treated water from effluent treatment system 160 and pulp from pulp storage 170, and the pH is adjusted to 3.2-3.8. The mixed pulp is then pumped into $D_{HT}$ bleaching tower 130 for bleaching, and then into preheater 140.

The cooling pulp ($t_2=24°$ C.) is pumped out of preheater 140 into washer 180. The pulp is then washed by washer 180 and alkaline extraction is performed by alkaline extraction system 190. The waste water from washer 180 is pumped into effluent treatment system 160, treated, and recycled.

Per the above, in conventional high temperature chlorine dioxide bleaching without preheating the chlorine dioxide, the steam consumption per ton of dry pulp is approximately 1,070 kg/h, and the chlorine dioxide dosage is 2.5%. This is compared with the high temperature chlorine dioxide bleaching of this embodiment, where the steam consumption per ton of dry pulp is approximately 555.58 kg/h, and the chlorine dioxide dosage was 2.0% to achieve the same brightness. This results in a reduction in the steam consumption per ton of dry pulp per hour of 48.05% and a 20% reduction in the amount of chlorine dioxide that is used to achieve the same brightness.

EXAMPLE 4

Relatively low-temperature chlorine dioxide ($T_1=2.6°$ C., concentration is 8.0 g/L in this embodiment) in storage tank 120 enters the shell-side pipeline of chlorine dioxide preheater 140. 0.5 mol/L of $ClO_2$ stabilizer (e.g., sodium percarbonate) is added into the chlorine dioxide solution. The thermal bleaching pulp ($t_1=95°$ C.) of the relatively high temperature chlorine dioxide bleaching stage provided by $D_{HT}$ bleaching tower 130 enters the tube-side of chlorine dioxide preheater 140 through a pipeline. Preheated chlorine dioxide ($T_2=37°$ C., concentration is 7.6 g/L in this embodiment) is pumped into the pulp mixer (commingler 150), along with treated water from effluent treatment system 160 and pulp from pulp storage 170, and the pH is adjusted to 3.2-3.8. The mixed pulp is then pumped into $D_{HT}$ bleaching tower 130 for bleaching, and then into preheater 140.

The cooling pulp ($t_2=26°$ C.) is pumped out of preheater 140 into washer 180. The pulp is then washed by washer 180 and alkaline extraction is performed by alkaline extraction system 190 is performed. The waste water from washer 180 is pumped into effluent treatment system 160, treated, and recycled.

Per the above, in conventional high temperature chlorine dioxide bleaching without preheating the chlorine dioxide, the steam consumption per ton of dry pulp is approximately 1,070 kg/h, and the chlorine dioxide dosage is 2.5%. This is compared with the high temperature chlorine dioxide bleaching of this embodiment, where the steam consumption per ton of dry pulp is approximately 483.36 kg/h, and the chlorine dioxide dosage was 1.8% to achieve the same brightness. This results in a reduction in the steam consumption per ton of dry pulp per hour of 54.80% and a 27% reduction in the amount of chlorine dioxide that is used to achieve the same brightness.

Figure 2:
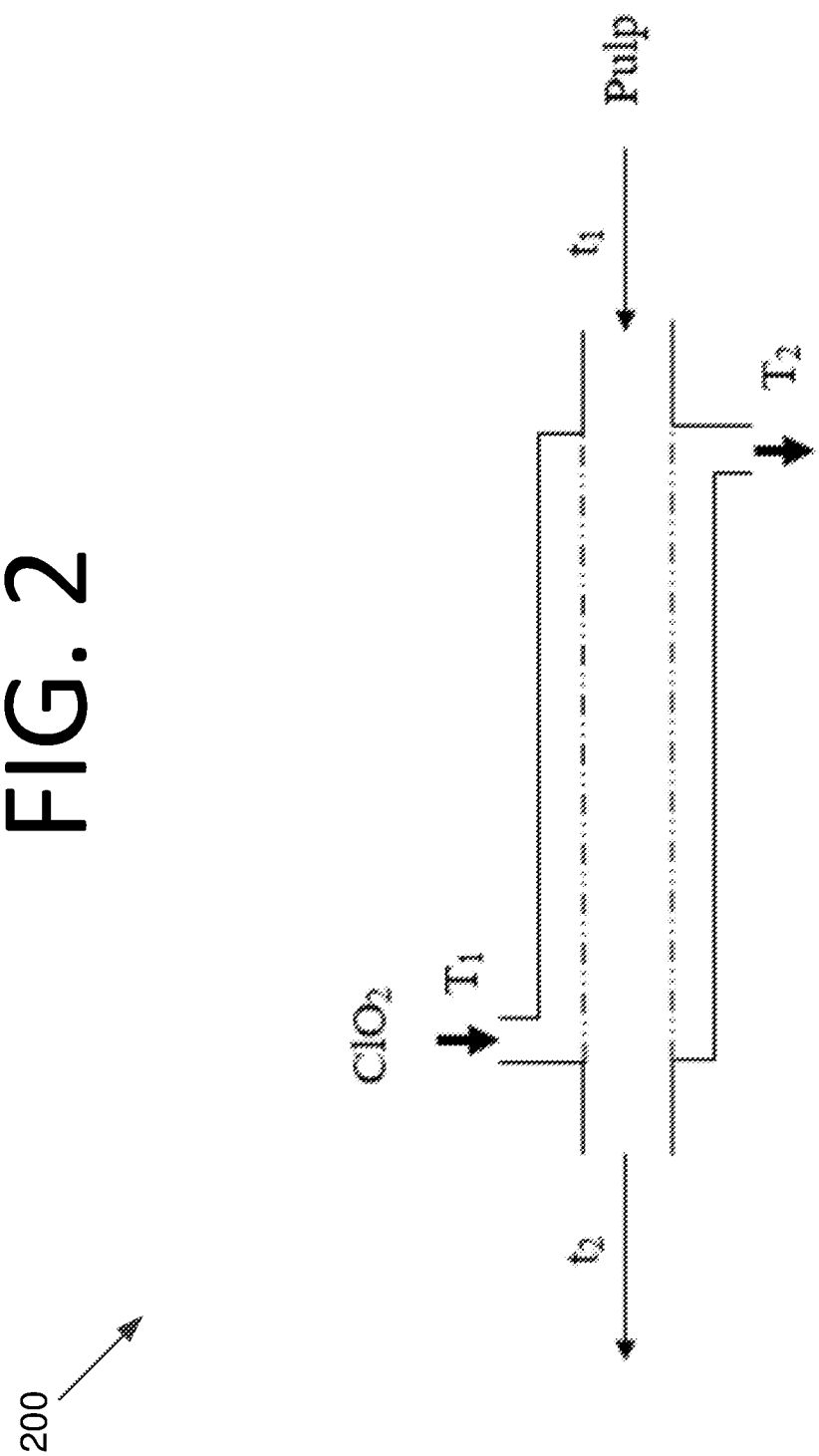
FIG. 2 is a schematic diagram of a chlorine dioxide preheater, according to an embodiment of the present invention.

FIG. 2 is a schematic diagram of a chlorine dioxide preheater 200, according to an embodiment of the present invention. In this embodiment, the vertical sides are the "tube-sides" and the horizontal sides are the "shell-sides". Similar to chlorine dioxide preheater 140 of FIG. 1, relatively low-temperature chlorine dioxide ($T_1$) mixed with a $ClO_2$ stabilizer is pumped into chlorine dioxide preheater 200. After heating, the preheated chlorine dioxide ($T_2$) is pumped out of chlorine dioxide preheater 200 to be mixed with pulp. After a thermal bleaching stage, thermal bleaching pulp ($t_1$), which includes the chlorine dioxide, is pumped into chlorine dioxide preheater 200. The cooling pulp ($t_2$) then is pumped out of chlorine dioxide preheater 200 for subsequent processing (e.g., washing and alkaline extraction). The chlorine dioxide and $D_{HT}$ pulp are pumped through the preheater relatively quickly in some embodiments.

Figure 3:
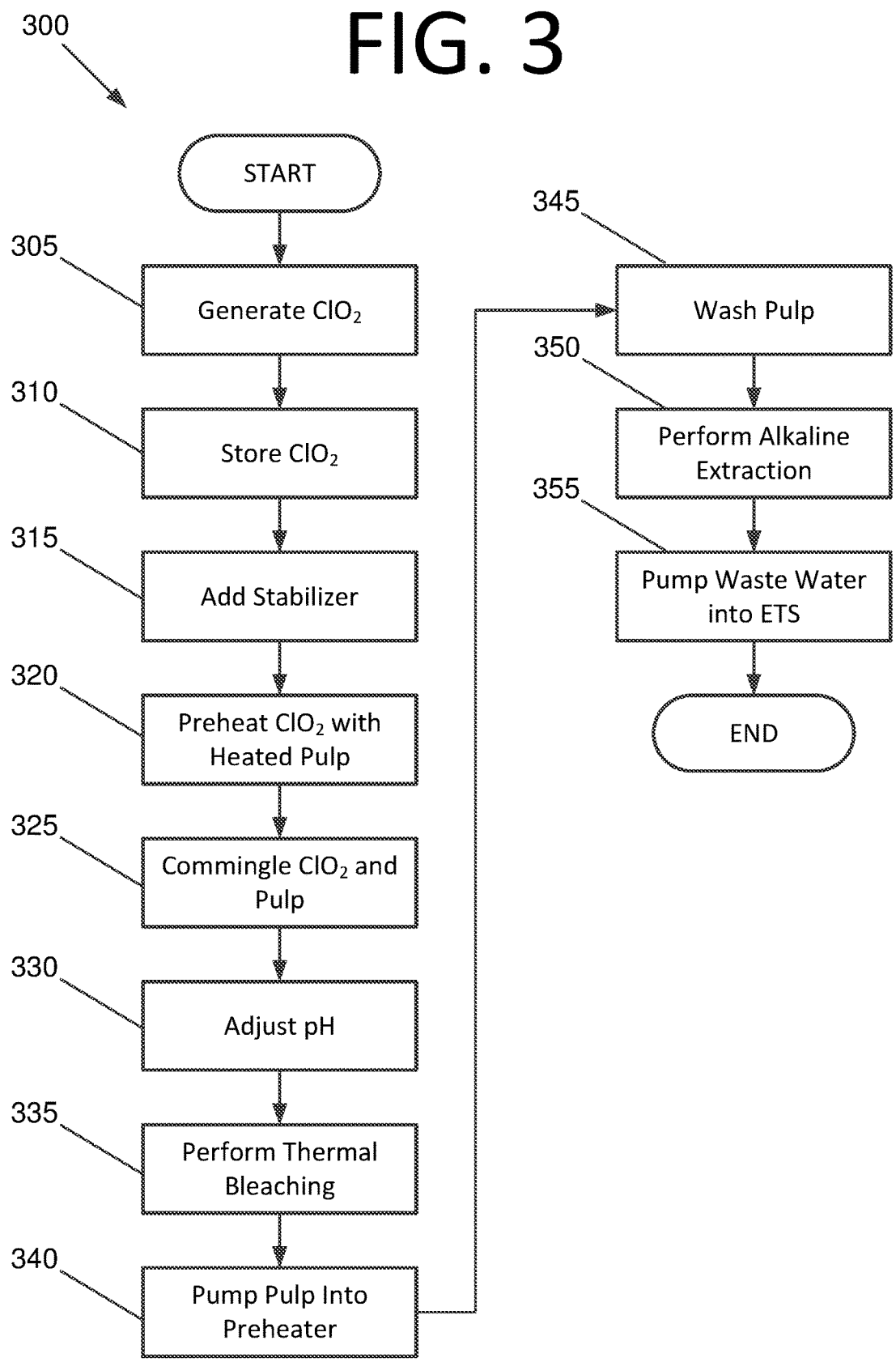
FIG. 3 is a flowchart illustrating a process for pulp bleaching with excess heat recovery, according to an embodiment of the present invention.

FIG. 3 is a flowchart 300 illustrating a process for pulp bleaching with excess heat recovery, according to an embodiment of the present invention. The process begins with generating chlorine dioxide at 305. The generated chlorine dioxide is then stored in a storage tank at 310 at a storage temperature of 2.4-4.6° C.

A stabilizer is added to the chlorine dioxide at 315 to keep it stable during preheating. Heated thermal bleaching pulp from a bleaching tower and the relatively cool chlorine dioxide are then pumped into a preheater, and the chlorine dioxide is heated to the desired temperature using the heat from the pulp (e.g., 31-37° C.) at 320. During preheating, the chlorine dioxide and heated pulp are kept separate from one another such that they do not mix.

The preheated chlorine dioxide and untreated pulp are commingled at 325. In some embodiments, treated water from an effluent treatment system is also included. The pH of the pulp and chlorine dioxide mixture is then adjusted at 330 to an acidic pH in the range of 3.2-3.8. The mixed pulp is then pumped into high temperature $D_{HT}$ bleaching tower and thermal bleaching is performed at 335. After bleaching, the now cooling pulp is pumped into the chlorine dioxide preheater at 340 to heat a new batch of chlorine dioxide. The pulp is then washed at 345 by a washer, and alkaline extraction is performed by alkaline extraction system at 350. The waste water from the washer is pumped into an effluent treatment system, and treatment and recycling of the waste water is performed at 355. The process may repeat as often a desired, depending on how much pulp is to be processed.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
   adding a stabilizer to chlorine dioxide to keep the chlorine dioxide stable during heating;
   introducing heated thermal bleaching pulp into a preheater;
   introducing the chlorine dioxide and stabilizer into the preheater in a separate, but thermally connected, location to the heated thermal bleaching pulp; and
   heating the chlorine dioxide using heat from the heated thermal bleaching pulp, wherein
   the thermal bleaching pulp remains in the preheater until reaching a temperature of 23 to 26° C.

2. The method of claim 1, wherein prior to heating, the chlorine dioxide is at a temperature of 2.4 to 4.6° C.

3. The method of claim 1, wherein the stabilizer is sodium percarbonate.

4. The method of claim 1, wherein the chlorine dioxide is heated to 31 to 37° C.

5. The method of claim 1, further comprising:
   mixing the heated chlorine dioxide with untreated pulp.

6. The method of claim 5, further comprising:
   adding treated water to the chlorine dioxide and untreated pulp before mixing, during mixing, or both.

7. The method of claim 5, further comprising:
   adjusting a pH of the pulp and chlorine dioxide mixture to be in the range of 3.2 to 3.8.

8. The method of claim 1, wherein the thermal bleaching pulp is heated via a DHT bleaching tower to a temperature of 85 to 95° C. prior to being introduced into the preheater.

9. The method of claim 1, further comprising:
   pumping the thermal bleaching pulp out of the preheater for subsequent processing once the pulp is cooled to 23 to 26° C.

10. A method for preheating chlorine dioxide using heated DHT thermal bleaching pulp, comprising:
    introducing the heated DHT thermal bleaching pulp into a preheater;
    introducing the chlorine dioxide into the preheater in a separate, but thermally connected, location to the heated DHT thermal bleaching pulp; and
    heating the chlorine dioxide using heat from the heated DHT thermal bleaching pulp, wherein
    the thermal bleaching pulp remains in the preheater until reaching a temperature of 23 to 26° C.

11. The method of claim 10, further comprising:
    adding a stabilizer to the chlorine dioxide to keep the chlorine dioxide stable during heating.

12. The method of claim 11, wherein the stabilizer is sodium percarbonate.

13. The method of claim 10, wherein the chlorine dioxide is heated to 31 to 37° C.

14. The method of claim 10, further comprising:
    mixing the heated chlorine dioxide with untreated pulp; and
    adding treated water to the chlorine dioxide and untreated pulp before mixing, during mixing, or both.

15. The method of claim 14, further comprising:
    adjusting a pH of the pulp and chlorine dioxide mixture to be in the range of 3.2 to 3.8.

16. The method of claim 10, wherein the thermal bleaching pulp is heated via a DHT bleaching tower to a temperature of 85 to 95° C. prior to being introduced into the preheater.

17. The method of claim 10, wherein
    the thermal bleaching pulp is pumped out of the preheater for subsequent processing once the pulp is cooled to 23 to 26° C.

18. A method for preheating chlorine dioxide using heated DHT thermal bleaching pulp, comprising:
    adding a stabilizer to the chlorine dioxide to keep the chlorine dioxide stable during heating, wherein the chlorine dioxide is at a temperature of 2.4 to 4.6° C. prior to heating;
    introducing the heated DHT thermal bleaching pulp into a preheater;

introducing the chlorine dioxide and stabilizer into the preheater in a separate, but thermally connected, location to the heated DHT thermal bleaching pulp; and
heating the chlorine dioxide using heat from the heated DHT thermal bleaching pulp until the chlorine dioxide reaches a temperature of 31 to 37° C., wherein
the thermal bleaching pulp remains in the preheater until reaching a temperature of 23 to 26° C.

19. The method of claim 18, further comprising:
mixing the heated chlorine dioxide with untreated pulp;
adding treated water to the chlorine dioxide and untreated pulp before mixing, during mixing, or both; and
adjusting a pH of the pulp and chlorine dioxide mixture to be in the range of 3.2 to 3.8.

* * * * *